United States Patent [19]

Clauss et al.

[11] Patent Number: 4,831,290

[45] Date of Patent: May 16, 1989

[54] LINEAR UNIT FOR HANDLING EQUIPMENT

[75] Inventors: Heinz Clauss, Stuttgart; Peter Drexel, Steinenbronn; Gerhard Gosdowski, Bietigheim-Bissingen; Andreas Kettner, Stuttgart; Ernst Leisner; Udo Schwarze, both of Ditzingen, all of Fed. Rep. of Germany

[73] Assignee: Robert Bosch GmbH, Stuttgart, Fed. Rep. of Germany

[21] Appl. No.: 155,719

[22] PCT Filed: May 8, 1987

[86] PCT No.: PCT/DE87/00213

§ 371 Date: Jan. 13, 1988

§ 102(e) Date: Jan. 13, 1988

[87] PCT Pub. No.: WO87/07454

PCT Pub. Date: Dec. 3, 1987

[30] Foreign Application Priority Data

May 30, 1986 [DE] Fed. Rep. of Germany ... 8614673[U]

[51] Int. Cl.⁴ .................................. H02K 41/03
[52] U.S. Cl. ........................... 310/12; 310/14; 318/135

[58] Field of Search .............. 310/12, 13, 14; 318/135

[56] References Cited

U.S. PATENT DOCUMENTS

| | | | |
|---|---|---|---|
| 3,954,037 | 5/1976 | Rios | 83/794 |
| 4,152,570 | 5/1979 | Inoue et al. | 310/12 |
| 4,286,180 | 8/1981 | Langley | 310/49 R |
| 4,377,761 | 3/1983 | Staciokas | 310/12 |
| 4,661,730 | 4/1987 | Maruyama et al. | 310/12 |

FOREIGN PATENT DOCUMENTS

| | | |
|---|---|---|
| 3537728 | 4/1986 | Fed. Rep. of Germany . |
| 2267690 | 11/1975 | France . |
| 57-66682 | 10/1983 | Japan . |
| 0224855 | 10/1986 | Japan ............... 310/12 |

Primary Examiner—Patrick R. Salce
Assistant Examiner—Judson H. Jones
Attorney, Agent, or Firm—Michael J. Striker

[57] ABSTRACT

A linear unit for handling equipment of industrial production is proposed, the longitudinally displaceably borne tool support (2 and 19) of which is designed as a gear rack of a linear motor (11 to 18 and 22 to 24) serving for driving the support.

11 Claims, 2 Drawing Sheets

LINEAR UNIT FOR HANDLING EQUIPMENT

BACKGROUND OF THE INVENTION

The invention is based on a linear unit. Units are suitable, for example, for seizing an object and displacing it with the aid of electromagnetic actuating drives in one or more predetermined directions by certain amounts, entered in advance. Since the displacement speeds are comparatively high, it is necessary to keep the mass of the moving tool support of the unit and of the rotor of the linear motor connected to it as small as possible, in order that their movements can be damped promptly and effectively. Thus, it may be ensured that the support is also actually stopped as well at the point at which the standstill is required. Therefore, materials or material combinations which meet the requirement for lowest possible mass, great rigidity and wear resistance are used for production of the tool supports. Hollow profiles of aluminium or a composite of aluminum and steel, produced in the extrusion process, have proved particularly suitable, the basic body consisting of aluminium and the bearing surfaces of steel strips.

Electromagnetically driven linear motors with a gear rack of magnetically conductive material as motor rotor and a magnetizable motor stator are known in large number. Such a motor is described, for example, in German Offenlegungsschrift No. 2,247,509. The moving element of the motor consists of a solid, magnetic bar, which may have round or rectangular cross-section and is provided on its outside surface with one or more rows of teeth of the same pitch. Opposite each row of teeth lie several pole masses, which are provided with windings and at the same time each have a toothing. The mutually facing surfaces of the rows of teeth lie in two parallel planes with an intermediate space, which forms the pole gap. The bar forming the moving element may, on account of the principle, be made only so thick that the magnetic lines of flux are able to penetrate it without difficulties.

It would be obvious simply to fit the known or a similarly designed linear motor to the holder of the tool support and connect its gear rack to the tool support in such a way that the gear rack is the driving element and the tool support is the driven element. Such a solution would be elaborate inasmuch as both the gear rack and the tool support require a precision bearing of their own and the linear unit as a whole would have a large volume.

SUMMARY OF THE INVENTION

The linear unit according to the invention is formed such that a separately borne gear rack as a motor rotor for the drive of the tool support is not necessary. The tool support at the same time forms the gear rack of the linear motor, so that the latter can be integrated completely in the assembly consisting of tool support and holder. This makes possible a partssaving and space-saving design of the linear unit. It is still possible as before to use profiles and materials which have a low mass and a great rigidity and wear resistance for the tool support.

In the case of tool supports which are produced from a non-magnetic material, it is advantageous to design the toothing as webs running perpendicular to the direction of movement of the tool support in a strip of magnetically conductive material which is fixed, preferably adhesively attached on the outer periphery of the tool support. If, on the other hand, the tool support consists of a magnetic material, it is expedient to form the toothing by milling or sawing of the support in transverse direction. In order to increase the motor power with the same overall length, it is further provided that the tool support has several toothings distributed around its periphery, to each of which toothings a motor stator, accommodated in the holder of the support, is assigned.

BRIEF DESCRIPTION OF THE DRAWINGS

Exemplary embodiments of the invention are represented in the drawing and explained in more detail in the following description.

DESCRIPTION OF THE PREFERRED EMBODIMENTS

Figure 1:
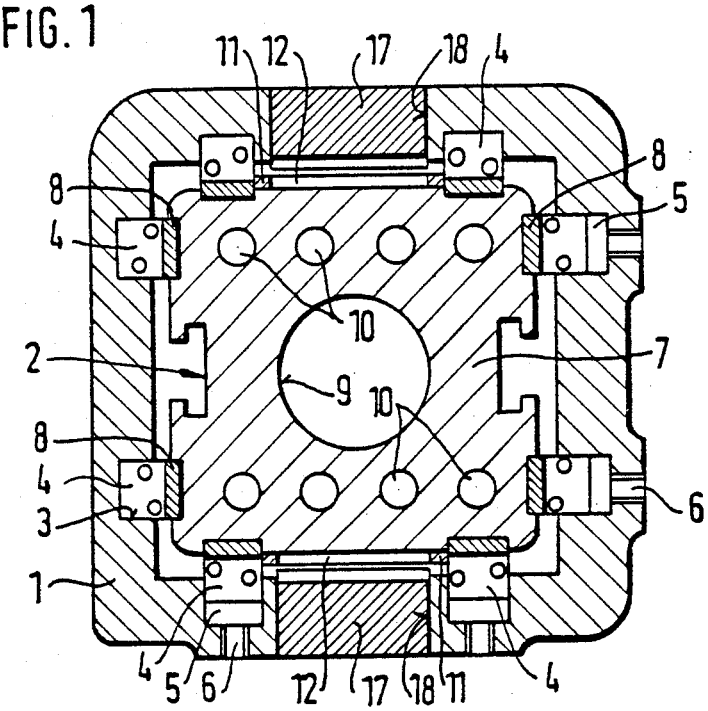
FIG. 1 shows a linear unit for handling equipment in cross-section.
Figure 2:
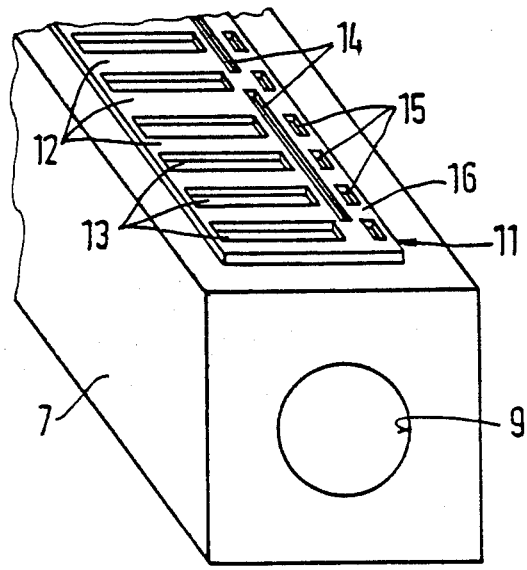
FIG. 2 shows a part of the tool support with a gear rack of the linear motor fitted to it, in perspective representation.
Figure 3:
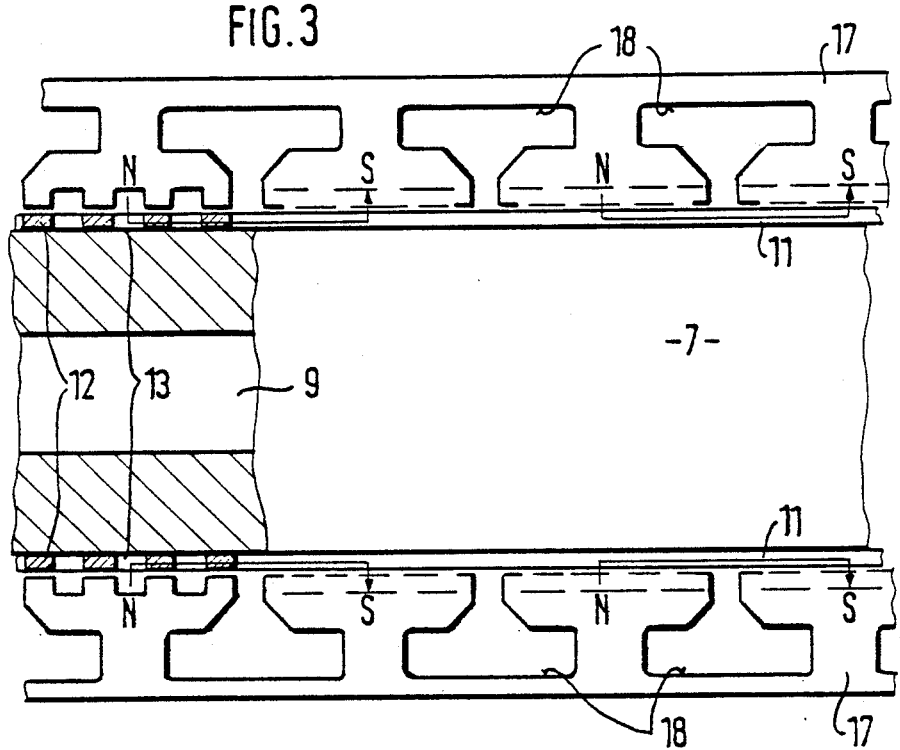
FIG. 3 shows the tool support with linear motor in a partially sectioned side view.

The linear unit shown in FIGS. 1 to 3 has a holder 1, which is designed as a tube and in which a tool holder 2 is borne longitudinally displaceably. The tube 1 has quadrilateral, preferably rectangular, cross-section and is produced as an extruded body, preferably of aluminium or of an aluminium alloy. Mutually parallel running longitudinal grooves 3 are pressed-in on the inside of the tube 1, into which grooves roller or ball bearings 4 are inserted, serving for longitudinal guidance of the tool support 2. At least two bearing devices are provided, which are arranged near the two ends of the holder 1. Each bearing device consists of a total of eight individual bearings 4, which are distributed in pairs over the four inside surfaces of the holder 1. Two of these four bearing pairs are supported outwardly each on a pressure plate 5, which is adjustable by means of a screw 6 for the purpose of eliminating bearing play.

The tool support 2 guided longitudinally displaceably in the holder 1 consists of a profile body 7 of approximately square cross-section, which consists of a lightweight material, preferably of aluminium or an aluminium alloy. In the region of the bearing 4, the profile body 7 is set with strips 8 of a hard, wear-resistant material, for example of a suitable steel alloy. The body 7 has a central opening 9 for the passage or reception of a fixed piston (not shown) for gravitational force balancing. In addition, there are several air ducts 10 for the supply of compressed air to pneumatically operated tools.

The tool support 2 with the body 7, the bearing strips 8, the central piston guide 9 and the air ducts 10 is produced in the combined extrusion moulding process, it being possible to use other metal or plastics combinations instead of an aluminium-steel combination, provided they are suitable for combined extrusion moulding.

An electromagnetically operated linear motor, on the moving element of which a moving magnetic field acts, serves for displacing the tool support 2 in the holder 1. In principle, such a motor consists of a gear rack which has teeth spaced equally apart on its entire length. Opposite these teeth is provided a limited number of tooth groups, which are designed as magnetizable pole shoes of a motor stator. The pole shoes are subjected alternately in each case to the effect of a magnetic field generated by an own winding, which causes the gear rack to execute a longitudinal movement parallel to the plane of the pole gap, so that the reluctance occurring between the mutually opposite teeth is reduced if a current flows through certain windings of the motor stator.

In order to make the linear unit as compact as possible and to save on means of guidance for the gear rack and on means of power transmission between the rack and the tool support 2, the tool support itself is designed as the gear rack of the linear motor. For this purpose, in the exemplary embodiment according to FIGS. 1 to 3, on two opposite parallel surfaces of the body 7 there is fixed, preferably by adhesion, between the bearing strips 8 in each case a strip 11 of magnetically conductive material, extending in the direction of displacement of the body. The strip 11 has webs 12, which were created by punching out rectangular-shaped openings 13 in the strip. The webs run perpendicular to the direction of movement of the tool support and are spaced equally apart. They form the toothing of the linear motor. Alongside the webs and openings there are, on one side of the strip 11, longitudinal slots 14, which lie one behind the other in the direction of movement of the tool support. Adjoining these slots is a further toothing, consisting of openings 15 and webs 16, for an electromagnetic position indicator, not shown in detail. The slots 14 serve for magnetically shielding the position indicator.

The associated motor stators 17 are in each case inserted in a break-through 18 of the holder 2 of the linear unit. They consist of laminated magnetic sheets, in which clearances 18 are provided for receiving exciter windings (not shown). On the surface facing the strip 8, the sheet stack is provided with teeth 19, which run parallel to the webs 12 and are separated from the latter by a pole gap. The exciter windings of each motor stator are wired to one another in such a way that the existing pole positions are given the poling which can be seen in FIG. 3. The magnetic flux paths run between two neighbouring unlike poles in the direction of the arrow lines drawn in, through the strip 11.

In the case of the exemplary embodiment according to FIGS. 1 to 3, two strips 8 serving as gear racks are attached on opposite flat surfaces of the body 7.

If need be, two further toothings and motor stators can be attached at a 90° offset in order to obtain a more powerful motor with the same overall length.

Figure 4:
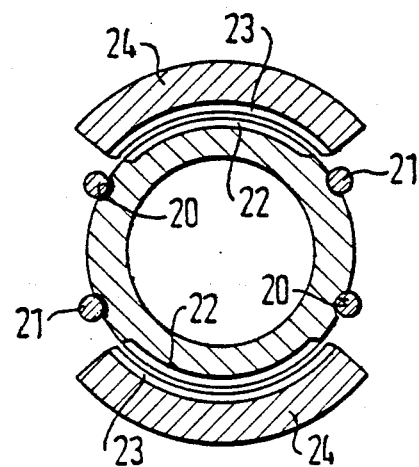
FIG. 4 shows a further exemplary embodiment of a linear unit in cross-section.

In the case of the linear unit according to FIG. 4, the tool support consists of a tube 19 of cylindrical cross-section. The tube has on its outer periphery four guide grooves for receiving ball-bearing elements or guide rods 21 arranged in the holder. Between each two guide grooves 20 on the same level there is attached on the outer periphery of the tube 19 a toothing 22, the teeth of which run transversely to the direction of displacement of the tube and are formed by milling or sawing.

Opposite each of the toothings 22 there is a toothing 23, which is a component part of motor stators 24 arranged in the holder of the tool support 19. Between the two toothings 22, 23 there is a pole gap.

We claim:

1. A linear unit for handling equipment of industrial production, comprising:
an electromagnetic linear drive unit including a magnetizable motor stator (17,24) and a motor rotor (2), said motor rotor being formed as a tool support (2), said stator being formed so as to longitudinally and displaceably guide said tool support (2), said tool support being formed as a gear rack having at least a portion composed of a magnetically conductive material.

2. The linear unit as defined in claim 1, wherein said tool support (2) has bearing surfaces, said gear rack having a toothing (12, 13, 22) fitted between said bearing surfaces.

3. The linear unit as defined in claim 1, wherein said tool support (2) is displaceable by said drive unit in a predetermined direction, said magnetically conductive material forming a strip (11) that extends in said predetermined direction.

4. The linear unit as defined in claim 2, wherein said tool support (2) has an outer periphery and is displaceable by said drive unit in a predetermined direction, said magnetically conductive material forming a strip (11), said toothing being formed as webs (12) running perpendicular to said predetermined direction in said strip, said strip (11) being fixed on said outer periphery of said tool support.

5. The linear unit as defined in claim 4, wherein said strip (11) is adhesively fixed to said tool support.

6. The linear unit as defined in claim 4, wherein said webs (12) are formed as punchouts in said strip (11) and extend perpendicular to said predetermined direction and are equally spaced apart.

7. The linear unit as defined in claim 2, wherein said tool support (2) is displaceable by said drive unit in a predetermined direction, said toothing (22) having milled teeth that run transverse to said predetermined direction.

8. The linear unit as defined in claim 2, wherein said tool support (2) is displaceable by said drive unit in a predetermined direction, said toothing (22) having sawed teeth that run transverse to said predetermined direction.

9. The linear unit as defined in claim 1, wherein said tool support is has a periphery formed with a plurality of peripheral portions with toothings, said drive unit includes a plurality of motor stators each associated with a respective one of said peripheral portions.

10. The linear unit as defined in claim 1, wherein said tool support is formed as a tube (19) with a cylindrical cross-section.

11. A linear unit for handling equipment of industrial production comprising an electromagnetic linear drive unit including a magnetizable motor stator (17, 24) and a motor rotor (2), said motor rotor being formed as a tool support (2), said stator being formed so as to longitudinally and displaceably guide said tool support (2), said tool support being formed as a gear rack having at least a portion composed of a magnetically conductive material, said strip having one side with a plurality of longitudinal slots (14) which lie one behind the other in said predetermined direction so as to serve as a magnetic shield for a position indicator.

* * * * *